Nov. 1, 1955 — F. W. RENWICK, SR — 2,722,260

ANTISKID ATTACHMENT FOR MOTOR VEHICLE TIRES

Filed March 3, 1954 — 2 Sheets-Sheet 1

INVENTOR.
FREDERICK W. RENWICK, SR.
BY
ATTORNEY.

United States Patent Office 2,722,260
Patented Nov. 1, 1955

2,722,260

ANTISKID ATTACHMENT FOR MOTOR VEHICLE TIRES

Frederick W. Renwick, Sr., Maple Shade, N. J.

Application March 3, 1954, Serial No. 413,809

1 Claim. (Cl. 152—225)

The present invention relates to that field of devices and attachments that are applied to the tires of motor vehicles for anti-skid purposes, and is concerned primarily with an attachment which can be applied and removed with a minimum of inconvenience to the car owner.

At the present time there is literally a multitude of devices of this general character. Perhaps the best example are the well-known anti-skid chains. However, all of the known devices for this purpose require considerable effort and manipulation in attaching them to the tire and their subsequent removal. Thus, the natural tendency is for the car owner to dispense with their use rather than go to the necessary trouble in putting them on and taking them off. Thus, cars are often driven under highly unsafe conditions and are, in many cases, left stalled and abandoned on roadways during snowy and icy conditions, because of the inability to generate the necessary traction.

With the foregoing conditions in mind, the present invention has in view as its foremost objective, the provision of an anti-skid attachment for motor vehicles which can be applied to a tire and removed therefrom with the absolute minimum of effort required by the car owner.

More in detail, the present invention has as an object the provision of an anti-skid attachment, of the character above indicated, which takes advantage of and utilizes the weight of the motor vehicle itself to secure the attachment and subsequently remove it.

In achieving the above object, the invention provides a so-called boot that is made of a material having required properties of resiliency and elasticity and which has an inner contour shaped to conform to that of the tire about which it is intended to engage. This boot has an open flared mouth at the top and is intended to be placed on the ground or roadway immediately in back of the tire to which it is to be applied. The car owner simply runs the car backwardly onto the boot and the weight of the car forces the tire into the boot, while the resilient and elastic properties cause the boot to return to its normal position and securely grip the tire. This boot is provided with a corrugated road engaging surface to provide the necessary anti-skid properties.

It is intended that this boot have a circumferential extent of about six or eight inches and any required number may be applied to any tire, as occasion demands. In many instances a single boot will be sufficient, while it is probable that four would be the maximum of whatever would be needed.

Another highly important object of the invention is to provide an anti-skid attachment, of the type noted, which is peculiarly designed to be stripped from the tire by a plain bar of metal, such as a jack handle, which cooperates with the motor vehicle itself. Thus, the boot is formed with a channel that is adapted to receive one end of this bar. With one end of the bar so inserted and the bar resting on the roadway, operation of the car will strip the boot from the tire.

Still another object is to provide two slightly modified forms of the invention wherein the boot itself is more rigid but is provided with highly simplified and easily operable devices for securing the attachment to the tire.

Various other more detailed objects and advantages of the invention, such as arise in connection with carrying out the above-noted ideas in a practical embodiment, will in part become apparent and in part be hereinafter stated as the description of the invention proceeds.

The invention, therefore, comprises an anti-skid attachment for motor vehicle tires which consists essentially of a boot that is shaped to snugly conform to the contour of a tire and which is made of a material having resilient and elastic properties of such a nature that the boot may be opened by the weight of a car to force its tire thereinto, with the boot subsequently grippingly engaging the tire. The invention also embraces certain modifications wherein the boot is provided with fastening devices.

For a full and more complete understanding of the invention, reference may be had to the following description and accompanying drawings wherein.

Figure 1:
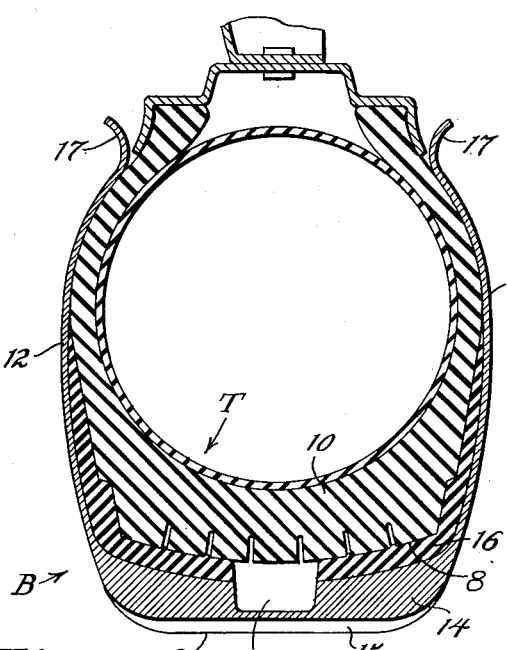
Figure 1 is a transverse vertical section taken through an automobile tire and a boot which has been applied thereto in accordance with the precepts of this invention.
Figure 2:
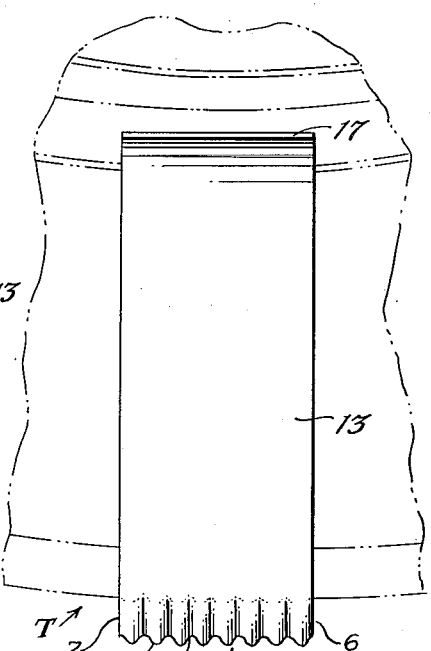
Figure 2 is a view in side elevation showing the boot as applied to the tire.

Referring now to the drawings and first more particularly to Figures 1 to 5 inclusive, in which the preferred embodiment of the invention is illustrated, a conventional automobile tire is therein illustrated and referred to in its entirety by the reference character T. The tire T ordinarily has a thickened tread portion at 10 which is formed with the usual tread grooves or corrugations 11. These corrugations extend circumferentially of the tire itself.

The anti-skid attachment of this invention comprises a boot which is referred to in its entirety by the reference character B. The boot B comprises side walls 12 and 13 which are integrally joined at the bottom to a thickened bottom wall 14. The latter is formed, on its outer or tread surface 9, with transverse corrugations 15 which incorporate the desired anti-skid properties to the boot.

As shown in the drawing, the side walls 12 and 13, and the bottom wall 14 are made of a metal having the required properties of resiliency and elasticity. Among such metals might be noted steeel and brass, or bronze. However, it is to be clearly understood that this particular material is not a limitation on the invention because it is believed that various rubber compositions could be evolved which could have the necessary properties. Thus, the boot B might just as well be made from rubber that is vulcanized around nylon or similar cord, in a well-known manner.

The lower portions of the walls 12 and 13 and the bottom 14 have their inner surfaces lined with a rubber pad 16 which serves to insure of a good snug fit of the boot over the tire and which also aids in establishing the necessary frictional engagement between the boot and the tire. The upper edges of the side walls 12 and 13 are flared outwardly, as indicated at 17, to provide, what is in effect a flared or open mouth for a purpose to be later pointed out.

Figure 4:
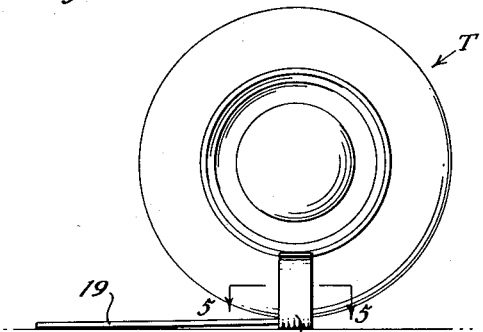
Figure 4 is a side elevation, somewhat diagrammatic, showing the bar in position for stripping the boot from the tire.
Figure 3:
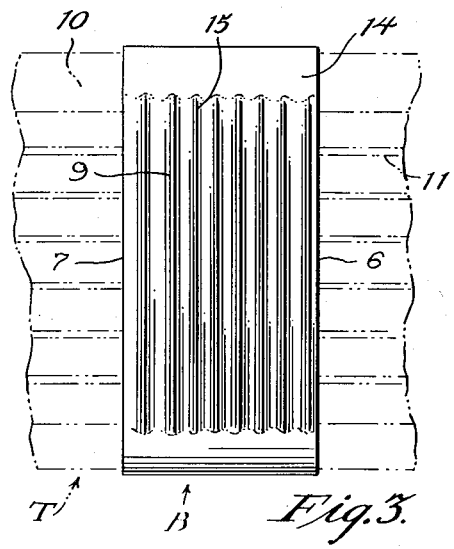
Figure 3 is a bottom plan view.
Figure 5:
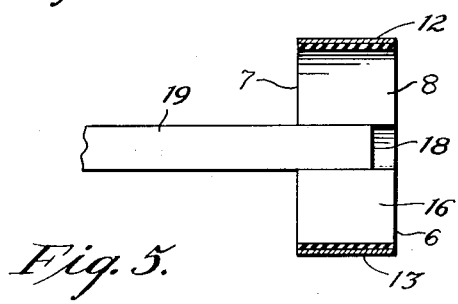
Figure 5 is a detailed horizontal section with the tire removed and is taken about on the plane represented by the line 5—5 of Figure 4.

Extending longitudinally through the pad 16 and a portion of the bottom wall 14 is a channel 18 that is designed to receive one end of a bar of metal, such as raised at 19 in Figure 4. This channel 18 opens onto the inner surface 8 of the bottom wall and extends between the end edges 7 and 6. Moreover, it is located substantially in the middle of the bottom wall, that is, substantially midway between the side walls 12 and 13.

*Operation, Figures 1 to 5 inclusive*

It is evident that the boot B may be placed on the roadway immediately in back of a tire, with the flared mouth presented by the lips 17 confronting the tire. The vehicle is now run backwardly onto the boot and the weight of the car will force the tire T into the boot. This insertion, of course, causes an initial expansion of the side walls 12 and 13, but due to their resilient and elastic nature they return to the gripping position illustrated in Figure 1. That is all that is required in applying the attachment to a tire.

When it is desired to remove the boot, one end of the bar 19 is inserted into the channel 18 with the bar resting on the roadway, as illustrated in Figure 4. The vehicle is now run backwardly and as the tire T rolls over the bar 19, the boot is stripped from the tire.

*First modification*

Figure 6:
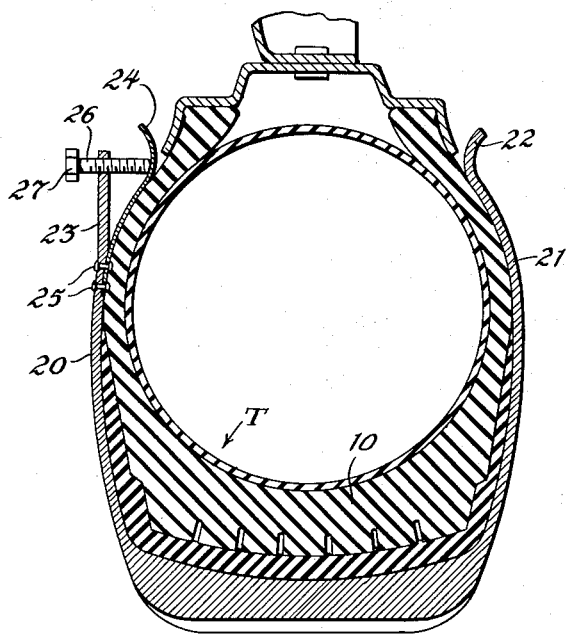
Figure 6 is a view similar to Figure 1, of a modification.
Figure 7:
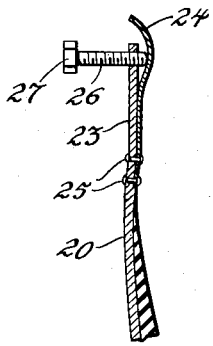
Figure 7 is a detailed sectional view showing the boot of Figure 6 as fully opened.
Figure 9:
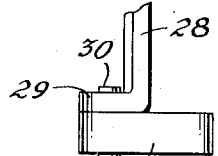
Figure 9 is a detailed top plan view taken about on the plane represented by the line 9—9 of Figure 8.

Referring now more particularly to Figures 6 and 7, a slightly modified form of the invention is therein illustrated. In this form, the boot is formed with side walls 20 and 21 which are fairly rigid as compared to the side walls 12 and 13 of Figure 1. The side wall 21 is formed with the same outwardly flared lip at 22 and is shaped to snugly conform to one side of the tire. The other side wall 20 extends straight upwardly from the widest point of the tire, as indicated at 23, and a spring flap 24 is secured to the inner face thereof in any preferred manner, such as by the rivets shown at 25. A screw stud 26 is received in a threaded opening in the wall portion 23 and has a head 27 that is adapted to be engaged by a wrench. The spring flap 24 is shaped to conform to the upper part of the tire, with which it is adapted to engage.

*Operation, Figures 6 and 7*

When the boot of Figures 6 and 7 is to be applied to a tire, the screw stud 26 is first retracted into the position illustrated in Figure 7. In this position the spring flap 24, due to its resilient nature, assumes a position against the side wall 23, leaving the upper part of the boot open so that it may receive the tire. After the tire has been fitted into the boot the screw stud 26 is tightened by the use of a wrench to force the spring flap 24 inwardly into the position shown in Figure 6.

Obviously when the boot is to be removed, all that is required is to again retract the screw stud 26.

*Second modification*

Referring now more particularly to Figures 8 to 11 inclusive, the boot has side walls of the same rigid properties as the walls 20 and 21 of Figure 6. One side wall, which is designated 28, extends upwardly beyond the widest part of the tire and is formed with an ear 29. Pivotally mounted on this ear 29, by a pin 30, is a cam 31. This cam 31 is formed with a socket 32 that is adapted to receive one end of an operating member 33. With the cam 31 in the position illustrated in Figure 8, the boot is locked about the casing, whereas when the cam is in the position of Figure 10, the boot is left open to permit its application to or removal from the tire.

*Operation, Figures 8 to 11 inclusive*

Figures 8, 10:
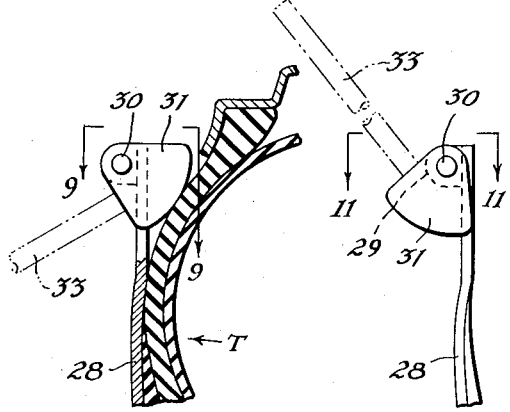
Figure 8 is another detailed section of a modification in which a cam is employed.
Figure 10 is a view in side elevation showing the cam in position for permitting removal of the tire.
Figure 11:
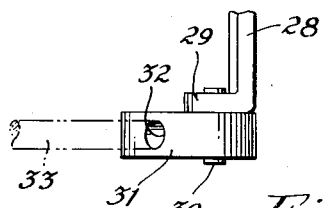
Figure 11 is another detailed top plan view taken on the plane represented by the line 11—11 of Figure 10.

While the operation of this form of the invention is believed to be obvious from the illustration of the drawings and description of parts given, it may be briefly outlined by noting that the cam 31 is first moved into the position of Figure 10. The boot is now applied to the tire, after which the handle 33 is inserted in the socket 32 and operated to swing the cam 31 about the pivot pin 30 into the position shown in Figure 8. This locks the boot in position on the tire. When the boot is to be removed, the came 31 is swung back into the position of Figure 10.

While a preferred specific embodiment of the invention is hereinbefore set forth, it is to be clearly understood that the invention is not to be limited to the exact materials, mechanisms and designs illustrated and described, because various modifications of these details may be provided in putting the invention into practice within the purview of the appended claim.

What is claimed is:

An anti-skid attachment for motor vehicle tires comprising a U-shaped boot intended to be applied to a tire and having end edges extending across the tire when so applied, said boot having side and bottom walls shaped to snugly conform to the contour of the tire to which it is intended to be applied, and made from a material having the property of resiliency which permits spreading of the side walls by the weight of a tire as carried on the car and a subsequent return to gripping engagement with the tire, said boot having a flared mouth for receiving a tire, said bottom wall having a tread surface adapted to engage the road and an inner surface adapted to engage the tire, said bottom wall being formed with a channel that opens onto said inner surface, extends between and through said end edges, and is located substantially midway between said side walls, said channel being adapted to receive a bar which will align with said tire for the purpose of removing the boot from the tire.

References Cited in the file of this patent

UNITED STATES PATENTS

| | | |
|---|---|---|
| 1,153,490 | Harris | Sept. 14, 1915 |
| 2,330,839 | O'Brien | Oct. 5, 1943 |
| 2,437,040 | Prevost | Mar. 2, 1948 |
| 2,530,108 | Whichard | Nov. 14, 1950 |
| 2,608,234 | Hughes | Aug. 26, 1952 |
| 2,679,882 | Rich | June 1, 1954 |